(12) United States Patent
Kuramochi

(10) Patent No.: US 7,203,465 B2
(45) Date of Patent: Apr. 10, 2007

(54) RECEIVER/TRANSMITTER CIRCUIT

(75) Inventor: Takashi Kuramochi, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 364 days.

(21) Appl. No.: 10/681,326

(22) Filed: Oct. 9, 2003

(65) Prior Publication Data
US 2004/0116076 A1 Jun. 17, 2004

(30) Foreign Application Priority Data
Oct. 11, 2002 (JP) .............................. 2002/299260

(51) Int. Cl.
H04B 1/44 (2006.01)
(52) U.S. Cl. ..................... 455/83; 455/73; 455/84; 455/86; 370/276; 370/280; 375/373; 375/374; 375/375
(58) Field of Classification Search ................ 455/83, 455/73, 84, 86; 370/276, 280; 375/373, 375/374, 375
See application file for complete search history.

(56) References Cited

U.S. PATENT DOCUMENTS

| 4,859,955 A | 8/1989 | Trethewey |
| 5,477,532 A * | 12/1995 | Hoshigami et al. ......... 370/277 |
| 5,878,331 A | 3/1999 | Yamamoto et al. |
| 6,233,227 B1 | 5/2001 | Izumi ........................ 370/280 |
| 6,411,660 B1 * | 6/2002 | Oh ............................ 375/327 |
| 6,480,553 B1 * | 11/2002 | Ho et al. ..................... 375/272 |

FOREIGN PATENT DOCUMENTS

| JP | 622114319 | 5/1987 |
| JP | 2007605 | 1/1990 |
| JP | 5-65140 | 8/1993 |
| JP | 5-283998 | 10/1993 |
| JP | 5-325405 | 12/1993 |
| JP | 06-303058 | 10/1994 |
| JP | 9-181642 | 7/1997 |
| JP | 9-200021 | 7/1997 |
| JP | 9-204231 | 8/1997 |
| JP | 9-261109 | 10/1997 |
| JP | 10-107677 | 4/1998 |
| JP | 11-220426 | 8/1999 |
| JP | 11-340870 | 12/1999 |
| JP | 2000-286744 | 10/2000 |
| JP | 2001-250918 | 9/2001 |
| JP | 2002-076956 | 3/2002 |

* cited by examiner

Primary Examiner—Matthew D. Anderson
Assistant Examiner—Sanh Phu
(74) Attorney, Agent, or Firm—Volentine & Whitt, P.L.L.C.

(57) ABSTRACT

A receiver/transmitter circuit includes an antenna terminal, a transmitter circuit which outputs a transmission signal in response to a transmit control signal, a receiver circuit which receives a reception signal from the antenna terminal, and a waveform control circuit. The waveform control circuit outputs a switching signal having a gradual logic transition in response to the transmit control signal. The receiver/transmitter circuit further includes a first switch connected between the antenna terminal and the transmitter circuit, and a second switch connected between the antenna terminal and the receiver circuit. The first switch transfers the transmission signal to the antenna terminal in response to the switching signal.

13 Claims, 8 Drawing Sheets

RECEIVER/TRANSMITTER CIRCUIT

CROSS REFERENCE TO RELATED APPLICATION

A claim of priority under 35 U.S.C. §119 is made to Japanese Patent Application No. 2002-299260, filed Oct. 11, 2002, which is herein incorporated by reference in their entirety for all purposes.

BACKGROUND OF THE INVENTION

1. Field of the Invention

The present invention relates to a receiver/transmitter circuit, and more specifically to a receiver/transmitter circuit which reduces noise.

2. Description of the Related Art

A conventional receiver/transmitter circuit has an antenna terminal, a transmitter circuit for transmitting a transmission signal to the antenna, a receiver circuit for amplifying a reception signal from the antenna terminal, an antenna switch for selectively transmitting the transmission signal from the transmitter circuit to the antenna terminal and the reception signal from the antenna terminal to the receiver circuit, and a phase locked loop circuit which oscillates for frequency conversion at the transmitter circuit and the receiver circuit. The transmitter circuit includes a power amplifier (PA), and the receiver circuit includes a low noise amplifier (LNA) which amplifies the reception signal. The antenna switch includes a switch which connects the antenna terminal to the power amplifier and a switch which connects the antenna terminal to the low noise amplifier. The conventional receiver/transmitter circuit is disclosed in Japanese Patent Laid-Open No. 2002-72956.

However, the conventional receiver/transmitter circuit can radiate noise when switching from a receiving node to a transmitting node. There are two major causes of this problem. First, rapid switching of the antenna switch itself radiates noise via the antenna terminal. Second, a load change at an oscillator of the phase locked loop during switching of the antenna switch can cause the frequency at the oscillator to change, thus generating noise in the transmission signal.

SUMMARY OF THE INVENTION

According to one aspect of the present invention, there is provided a receiver/transmitter circuit which includes an antenna terminal, a transmitter circuit which outputs a transmission signal in response to a transmit control signal, a receiver circuit which receives a reception signal from the antenna terminal, a waveform control circuit which outputs a switching signal that has a gradual waveform transition in response to the transmit control signal, a first switch connected between the antenna terminal and the transmitter circuit, wherein the first switch transfers the transmission signal to the antenna terminal in response to the switching signal, and a second switch connected between the antenna terminal and the receiver circuit.

DETAILED DESCRIPTION OF THE PREFERRED EMBODIMENTS

Figure 1:
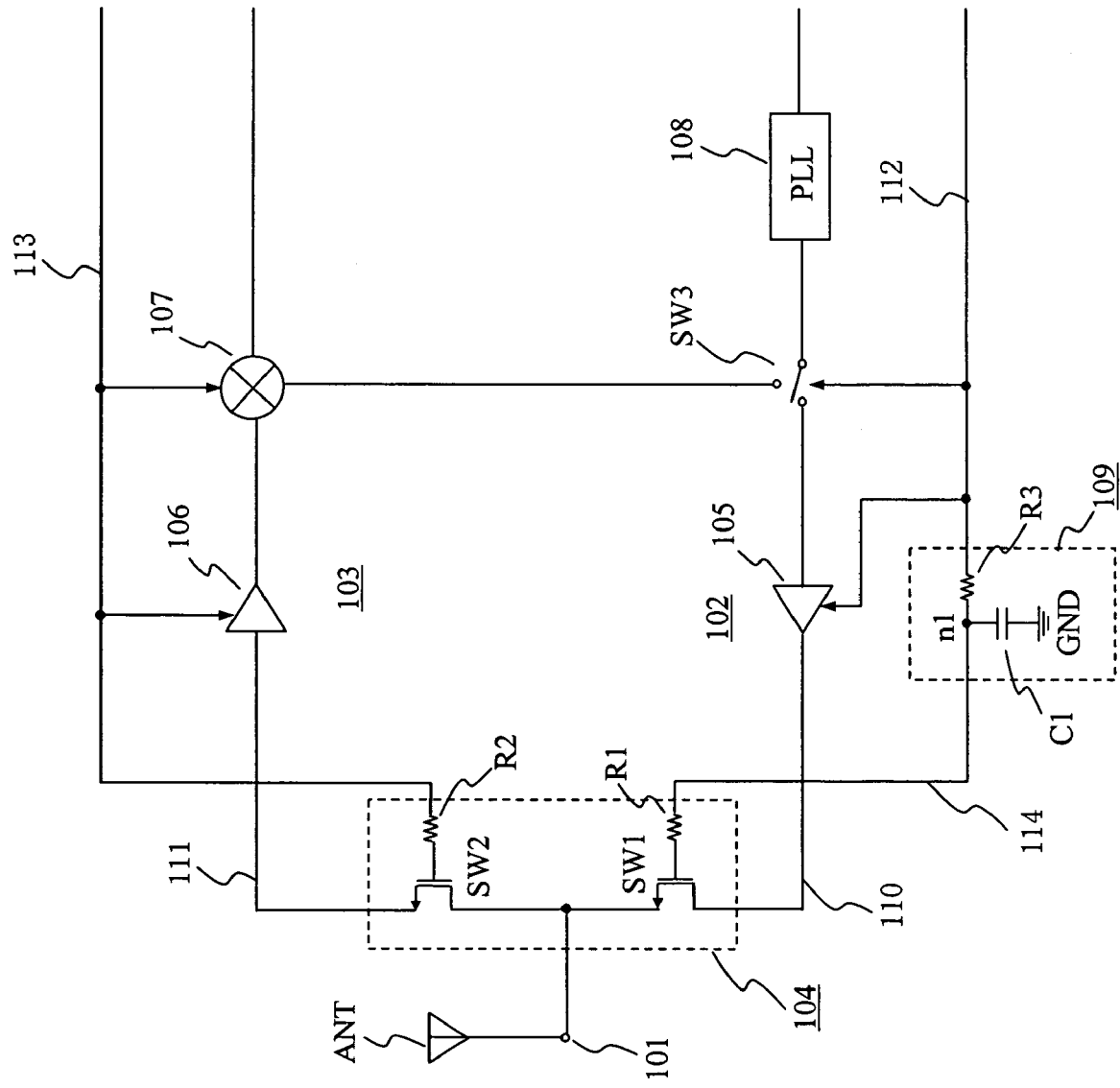
FIG. 1 is a schematic diagram showing a receiver/transmitter circuit of a first preferred embodiment.

A receiver/transmitter circuit according to preferred embodiments of the present invention will be explained hereinafter with reference to the accompanying figures. In order to simplify the explanation, like elements are given like or corresponding reference numerals. Dual explanations of the same elements are avoided. Also, in the figures, signals and their respective wirings are denoted by the same reference numerals.

First Preferred Embodiment

FIG. 1 is a schematic diagram showing a receiver/transmitter circuit of a first preferred embodiment. The receiver/transmitter circuit of the first preferred embodiment includes an antenna terminal 101, a transmitter circuit 102 for outputting a transmission signal 110 to the antenna terminal 101, a receiver circuit 103 for amplifying a reception signal 111 from the antenna terminal 101, an antenna switch 104 for selectively supplying the transmission signal 110 outputted from the transmitter circuit 102 to the antenna terminal 101 or the reception signal 111 from the antenna terminal 101 to the receiver circuit 103, a phase locked loop (PLL) circuit 108 for generating an signal used in the transmitter circuit 102 and the receiver circuit 103, a waveform control circuit 109 for outputting a switching signal 114 that has a gradual logic transition in response to a transmit control signal 112, and a switch circuit SW3 for selectively supplying the output signal from the PLL circuit 108 to transmitter circuit 102 or the receiver circuit 103. The antenna terminal is connected to an antenna ANT.

The transmitter circuit 102 includes a power amplifier (PA) 105. The receiver circuit 103 includes a low noise amplifier (LNA) 106 and a mixer 107. The mixer 107 mixes an output signal from the LNA 106 and an output signal from the PLL circuit 108 and outputs a mixed signal to a next circuit (not shown). The antenna switch 104 includes a switch element SW1 for connecting the antenna terminal 101 to the power amplifier 105 and switch element SW2 for connecting the antenna terminal 101 to the low noise amplifier 106.

The switch element SW1 includes an NMOS (N-channel type Metal Oxide Semiconductor) transistor. The NMOS transistor of the switch element SW1 includes a first electrode connected to the antenna terminal 101, a second electrode connected to an output terminal of the power amplifier 105 and a control electrode connected to the waveform control circuit 109 via a resistor R1. The resistor R1 inhibits the flow of current and/or noise from the transmit signal line 110 and the receive signal line 111 to the control signal line 114. The switch element SW2 includes an NMOS transistor. The NMOS transistor of the switch element SW2 includes a first electrode connected to the antenna terminal 101, a second electrode connected to an input terminal of the low noise amplifier 106 and a control electrode connected to receive control signal 113. The resistor R2 inhibits the flow of current and/or noise from transmit signal line 110 and the receive signal line 111 to the control signal line 113.

The waveform control circuit 109 is a low pass filter including a resistor R3 and a capacitor C1. One end of the resistor R3 is connected to the switching signal line 114 and the other end of the resistor R3 is connected to the transmit control signal line 112. The capacitor C1 is connected between the one end of the resistor R3 and a ground voltage node. The ground voltage node is applied with a ground voltage. For example, a value of these resistors R1, R2 and R3 are about 15 KΩ.

An operation of the receiver/transmitter circuit in the first preferred embodiment is described below.

Figure 4:
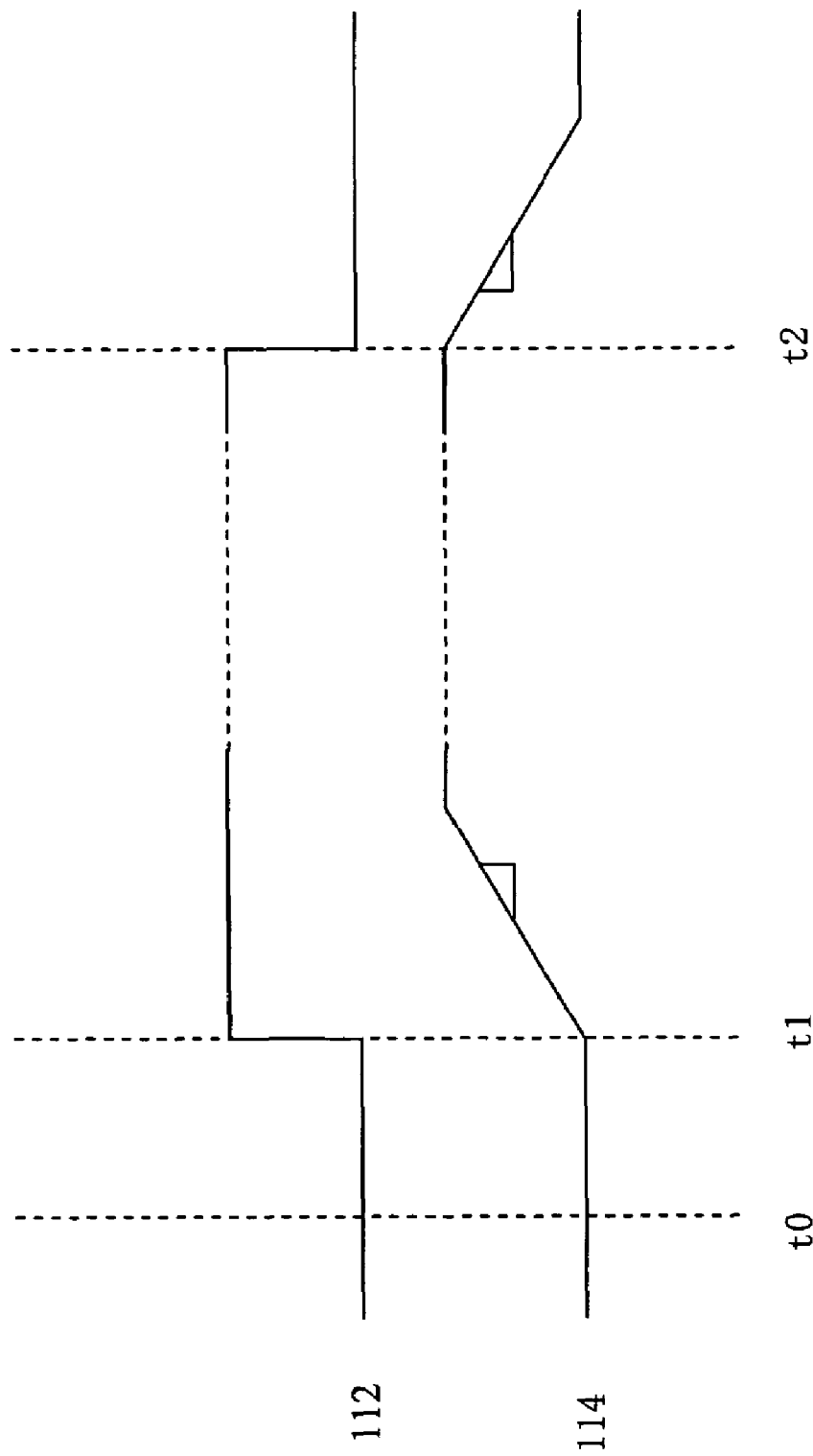
FIG. 4 is a plot of a state of a transmit control signal 112 and a state of a switching signal 114.

First, a receive operation is described. In the receive operation, the receive control signal 113 has a high level ("H") and the transmit control signal 112 and the switching signal 114 have a low level ("L"). A state of the transmit control signal 112 and a state of the switching signal 114 is shown in FIG. 4. The transmit control signal 112 and the switching signal 114 is the "L" level at t0. The switch element SW2 is switched ON in response to the "H" level of the receive control signal 113. While the switch element SW2 is ON, the antenna terminal 101 is connected to the input terminal of the low noise amplifier 106. The switch element SW1 is switched OFF in response to the "L" level of the switching signal 114. While the switching signal 114 is OFF, the antenna terminal 101 is disconnected to the input terminal of the power amplifier 105. That is, a signal received in the antenna ANT is transferred to the low noise amplifier 106 (the receive circuit 103) via the antenna terminal 101, the switch element SW2 and the receive signal line 111.

Second, an operation for changing from a receive operation to a transmit operation is described. When the operation changes from the receive operation to the transmit operation, the transmit control signal 112 and the switching signal 114 change from the "L" level to the "H" level. The state of the transmit control signal 112 and the switching signal 114 at this time is shown in FIG. 4 at t1. The transmit control signal 112 has a pulse shaped waveform. The switch circuit SW3 connects the PLL circuit 118 to the input terminal of the power amplifier 105 in response to the "H" level of the transmit control signal 112. The power amplifier 105 is activated in response to the "H" level of the transmit control signal 112.

The waveform control circuit 109 generates a switching signal 114 that has a gradual logic transition based on the transmit control signal 112. When the transmit control signal 112 turns to the "H" level, the capacitor C1 is charged. Since the capacitor C1 is charged, the level of node n1 (the level of the switching signal 114) is gradually raised. A rising speed of the voltage level at node n1 can be controlled by choice of the value of the resistor R1 and the value of the capacitor C1. The switch element SW1 is gradually turned on, in response to the switching signal 114 that gradually changed from the "L" level to the "H" level. A length of time for changing from the "L" level to the "H" level at the switching signal 114 is in the range of 1 μs to 10 μs. Accordingly, the switch element SW1 is turned on, and the antenna terminal 101 is connected to the power amplifier 105. Since the switch element SW1 is gradually turned on, the noise generated from the switch element SW1 is reduced.

The receive control signal 113 changes from the "H" level to the "L" level. The switch element SW2 is turned off in response to the "L" level of the receive control signal 113. The low noise amplifier 106 and the mixer 107 are deactivated in response to the "L" level of the receive control signal 113.

In the operation described above, the transmission signal 110 outputted from the power amplifier 105 is transferred to the antenna terminal 101 via the transfer signal line 110 and the switch element SW1.

The receiver/transfer circuit of the first embodiment includes the waveform control circuit 109 that graduates the logic transition of the transmit control signal 112 and outputs the graduated signal as the switching signal 114. As a result, the noise generated in the switch element SW1 is reduced and the noise radiated from the antenna ANT is reduced.

Second Preferred Embodiment

Figure 2:
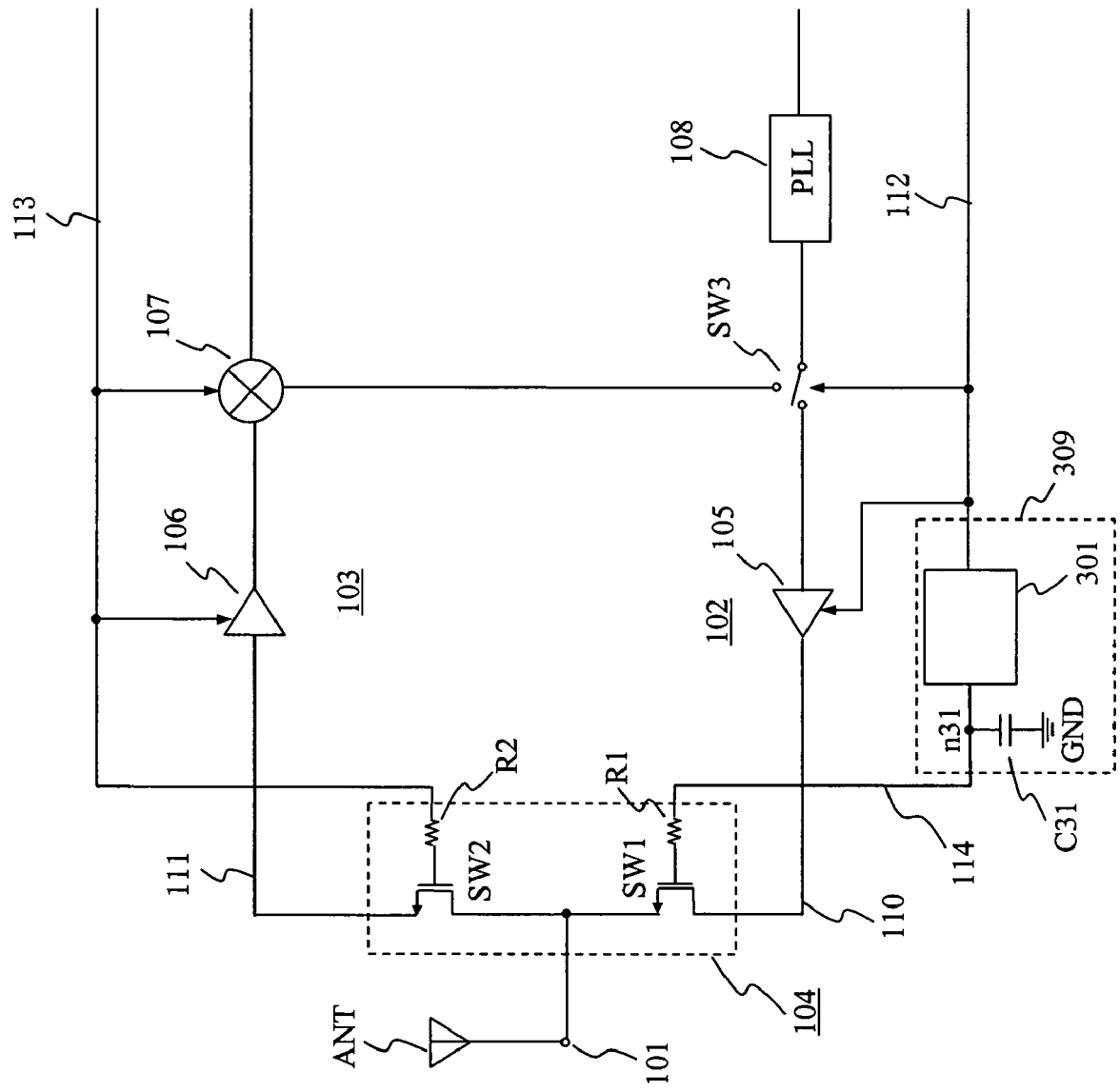
FIG. 2 is a schematic diagram showing a receiver/transmitter circuit of a second preferred embodiment.

FIG. 2 is a schematic diagram showing a receiver/transmitter circuit of a second preferred embodiment. In the receiver/transmitter circuit of the second embodiment, a waveform control circuit 109 in the receiver/transmitter circuit of the first embodiment is replaced with the waveform control circuit 309. Other components are the same as disclosed in the first embodiment shown in FIG. 1.

The waveform control circuit 309 is connected to the switch element SW1 via the resistor R1. The waveform control circuit 309 includes a current source circuit 301 for outputting a set current in response to the transmit control signal 112 and a capacitor C31 for storing a charge inputted on the node n31.

Figure 3:
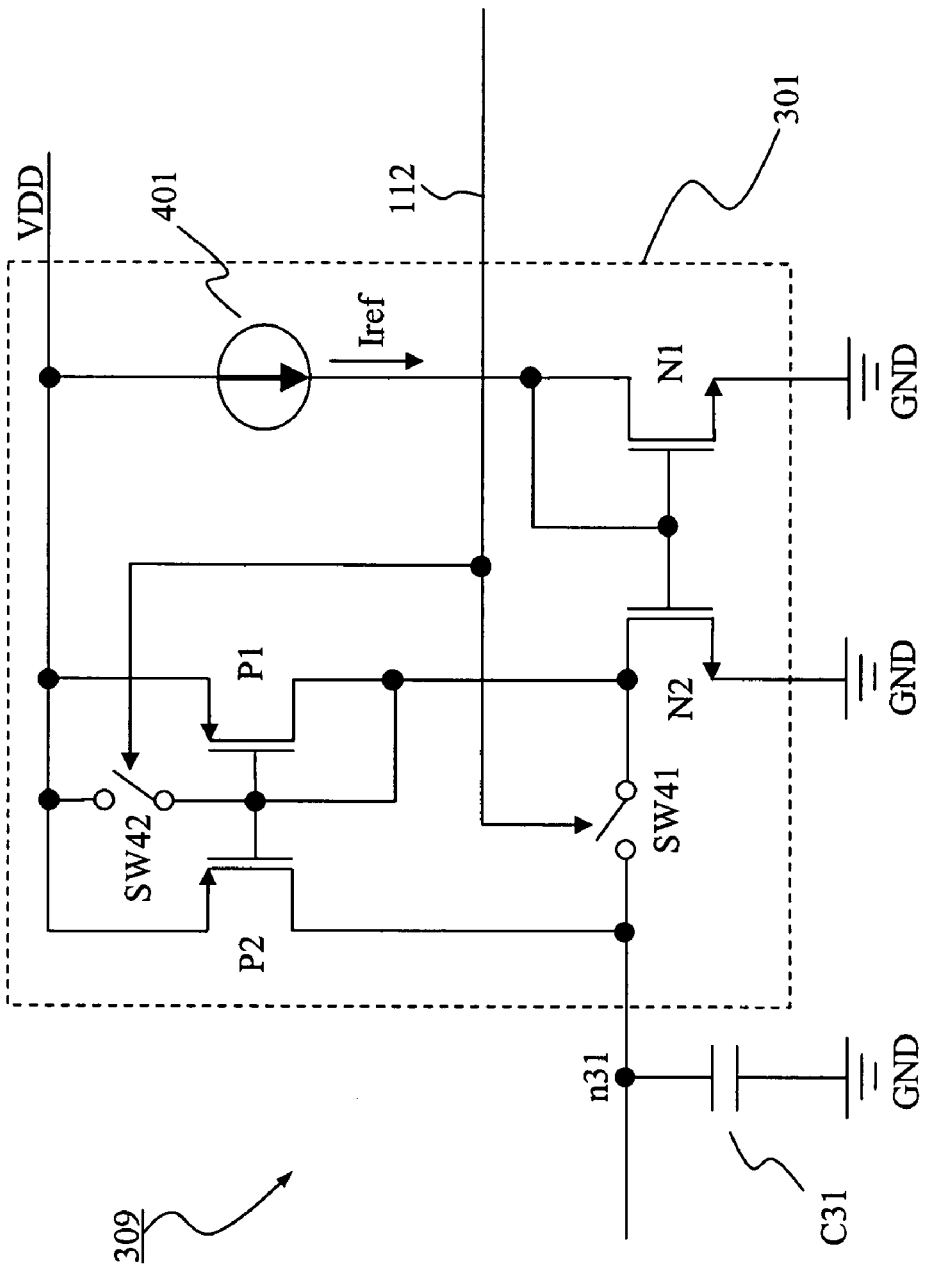
FIG. 3 is a schematic diagram showing a current source circuit 301 depicted in FIG. 2.

FIG. 3 is the schematic diagram showing the current source circuit 301. The current source circuit 301 includes a current source 401 for outputting a predetermined current Iref, a switch elements SW41 and SW42 for operating in response to the transmit control signal 112, NMOS transistors N1 and N2 for forming a first current mirror circuit, and PMOS (P-channel type Metal Oxide Semiconductor) transistors P1 and P2 for forming a second current mirror circuit. The current source 401 is coupled between a power voltage node and the NMOS transistor N1. A power voltage VDD is supplied to the power voltage node. The switch element SW41 is connected between the NMOS transistor N2 and the node n31. The switch element SW42 is connected between the power voltage node and the gates of the PMOS transistors P1 and P2. The NMOS transistor N1 has a source electrode connected to a ground voltage node, a drain electrode connected to the current source 401 and a gate electrode connected to the drain electrode. A ground voltage GND is supplied to the ground voltage node. The NMOS transistor N2 has a source electrode connected to the ground voltage node, a drain electrode connected to the PMOS transistor P1 and a gate electrode connected to the gate electrode of the NMOS transistor N1. The NMOS transistor N1 and the NMOS transistor N2 forms the first current mirror circuit. The NMOS transistor N1 is a current input side of the first current mirror circuit and the NMOS transistor N2 is a current output side of the first current mirror circuit. The NMOS transistor N1 is designed same dimension as the NMOS transistor N2.

The PMOS transistor P1 has a source electrode connected to the power voltage node, a drain electrode connected to the drain electrode of the NMOS transistor N2 and a gate electrode connected to the drain electrode of the PMOS transistor P1. The PMOS transistor P2 has a source electrode connected to the power voltage node, a drain electrode connected to the node n31 and a gate electrode connected to the gate electrode of the PMOS transistor P1. The PMOS transistor P1 and the PMOS transistor P2 form the second current mirror circuit. The PMOS transistor P1 is a current input side of the second current mirror circuit and the PMOS transistor P2 is a current output side of the second current mirror circuit. The PMOS transistor P1 is designed same dimension as the PMOS transistor P2. The capacitor C31 is connected between the node n31 and the ground voltage node. The node n31 is connected to the switch element SW1 via the resistor R1.

An operation of the receiver/transmitter circuit in the second preferred embodiment is described below.

First, an operation at receiving is described. In a receive operation, the receive control signal 113 has the "H" level and the transmit control signal 112 and the switching signal 114 have the "L" level. The switch element SW2 is switched ON in response to the "H" level of the receive control signal 113. While the switch element SW2 is ON, the antenna terminal 101 is connected to the input terminal of the low noise amplifier 106. The switch element SW1 is switched OFF in response to the "L" level of the switching signal 114. While the switching signal 114 is OFF, the antenna terminal 101 is disconnected to the input terminal of the power amplifier 105. That is, a signal received in the antenna ANT is transferred to the low noise amplifier 106 (the receive circuit 103) via the antenna terminal 101, the switch element SW2 and the receive signal line 111.

Second, an operation for changing from a receive operation to a transmit operation is described. When the operation changes from the receive operation to the transmit operation, the transmit control signal 112 and the switching signal 114 change from the "L" level to the "H" level.

The state of the transmit control signal 112 and a state of the switching signal 114 is shown in FIG. 4. The transmit control signal 112 and the switching signal 114 is the "L" level at t0. The transmit control signal 112 changes from the "L" level to the "H" level at the t1. The transmit control signal has a pulse shaped waveform. The switch circuit SW3 connects the PLL circuit 108 to the input terminal of the power amplifier 105 in response to the "H" level of the transmit control signal 112. The power amplifier 105 is activated in response to the "H" level of the transmit control signal 112.

The waveform controls circuit 309 generates a switching signal 114 that has a gradual waveform based on the transmit control signal 112. The current source circuit 301 supplies a current to the node n31 in response to the "H" level transmit control signal 112. The capacitor C31 is charged by the charge from the node 31. Since the capacitor C31 is charged, the level at the node n31 is raised gradually. A rising speed of the voltage level at node n31 can be controlled by the current value outputted from the current source circuit 301 and the value of the capacitor C31.

An operation of the current source circuit 301 is described using the FIG. 3. The switch elements SW 41 and SW 42 are turned on in response to the "H" level of the transmit control signal 112. The current Iref outputted from the current source 401 is flow through the NMOS transistor N1. Since the NMOS transistors N1 and N2 form the current mirror circuit and the dimension of these transistors are same, the current Iref flows through the PMOS transistor P1. Since the PMOS transistors P1 and P2 form the current mirror circuit and the dimension of these transistors are same, the current Iref flows through the PMOS transistor P2. The current Iref flowed through the PMOS transistor P2 flows to the capacitor C31.

The charge is stored in the capacitor C31 by flowing the current Iref to the capacitor C31. As a result, the level at the node n31 rises gradually. That is, the switching signal 114 gradually changes from the "L" level to the "H" level.

The rising speed of the voltage level at the node n31 is decided by the value of the Iref and the value of the capacitor C31. The rising speed of the voltage level at the node n31 is shown as follows.

iref/c31

In above expression, the value of the current Iref is expressed by iref and the value of the capacitor C31 is expressed by c31.

The voltage level Vn31 of the node n 31 is approximately equal to $iref*t/c31$.

The switch element SW1 is turned on gradually in response to the graduated switching signal 114. The switch element SW1 is gradually turned on in response to the switching signal 114 that gradually changed from the "L" level to the "H" level. A length of time of changing from the "L" level to the "H" level at the switching signal 114 is in the range of 1 µm to 10 µm. Accordingly, the switch element SW1 is turned on, the antenna terminal 101 is connected to the power amplifier 105. Since the switch element SW1 is gradually turned on, the noise generated from the switch element SW1 is reduced.

The receive control signal 113 changes from the "H" level to the "L" level. The switch element SW2 is turned off in response to the "L" level of the receive control signal 113. The low noise amplifier 106 and the mixer 107 are deactivated in response to the "L" level of the receive control signal 113.

In the operation described above, the transmission signal 110 outputted from the power amplifier 105 is transferred to the antenna terminal 101 via the transfer signal line 110 and the switch element SW1.

Third, an operation during from transmitting to receiving is described. When the operation changes from the transmitting operation to the receiving operation, the transmit control signal 112 changes from the "H" level to the "L" level (t2 at FIG. 4). The transmit control signal 112 has a pulse shaped waveform. The switch elements SW41 and SW42 are turned on in response to the "L" level of the transmit control signal 112. Since the switch elements SW41 and SW42 are ON, the PMOS transistors P1 and P2 are turned off. The current Iref outputted from the current source 401 flows through the NMOS transistor N1. Accordingly to the NMOS transistor N1 and N2 form the current mirror circuit and the dimension of these transistors are designed as same, the current Iref flows through the NMOS transistor N2. The charge stored in the capacitor C31 is discharged to the ground via the node n31 and the NMOS transistor N2. Accordingly, the capacitor C31 is discharged, the level of the node n31 is gradually declined. A decline speed of the voltage level at the node n31 is decided by the value of the current Iref and the value of the capacitor C31. The decline speed of the voltage level at the node n31 is shown as follows.

−iref/c31

In above expression, the value of the current Iref is expressed by iref and the value of the capacitor C31 is expressed by c31.

The voltage level Vn31 of the node n 31 is approximately equal to $VDD-iref*t/c31$.

The receive control signal 113 is changed from the "L" level to the "H" level. The switch element SW2 is turned on in response to the "H" level of the receive control signal. The low noise amplifier 106 and the mixer 107 are activated in response to the "H" level of the receive control signal 113. As a result, a signal received by the antenna ANT is transferred to the low noise amplifier 106 via the switch element SW2 and the receive signal line 111.

The receiver/transfer circuit of the second embodiment includes the waveform control circuit 309 that graduates the logic transition of the transmit control signal 112 and outputs the graduated signal as the switching signal 114. As a result, the noise generated in the switch element SW1 is reduced and the noise radiated from the antenna ANT is reduced.

In the second embodiment, reducing the value of the current Iref can slow the rising speed of the voltage level at the node n31. That is, the value of the capacitor C31 can be reduced. As a result, since the small size capacitor can be used, total size of the semiconductor device is reduced.

Third Preferred Embodiment

Figure 5:
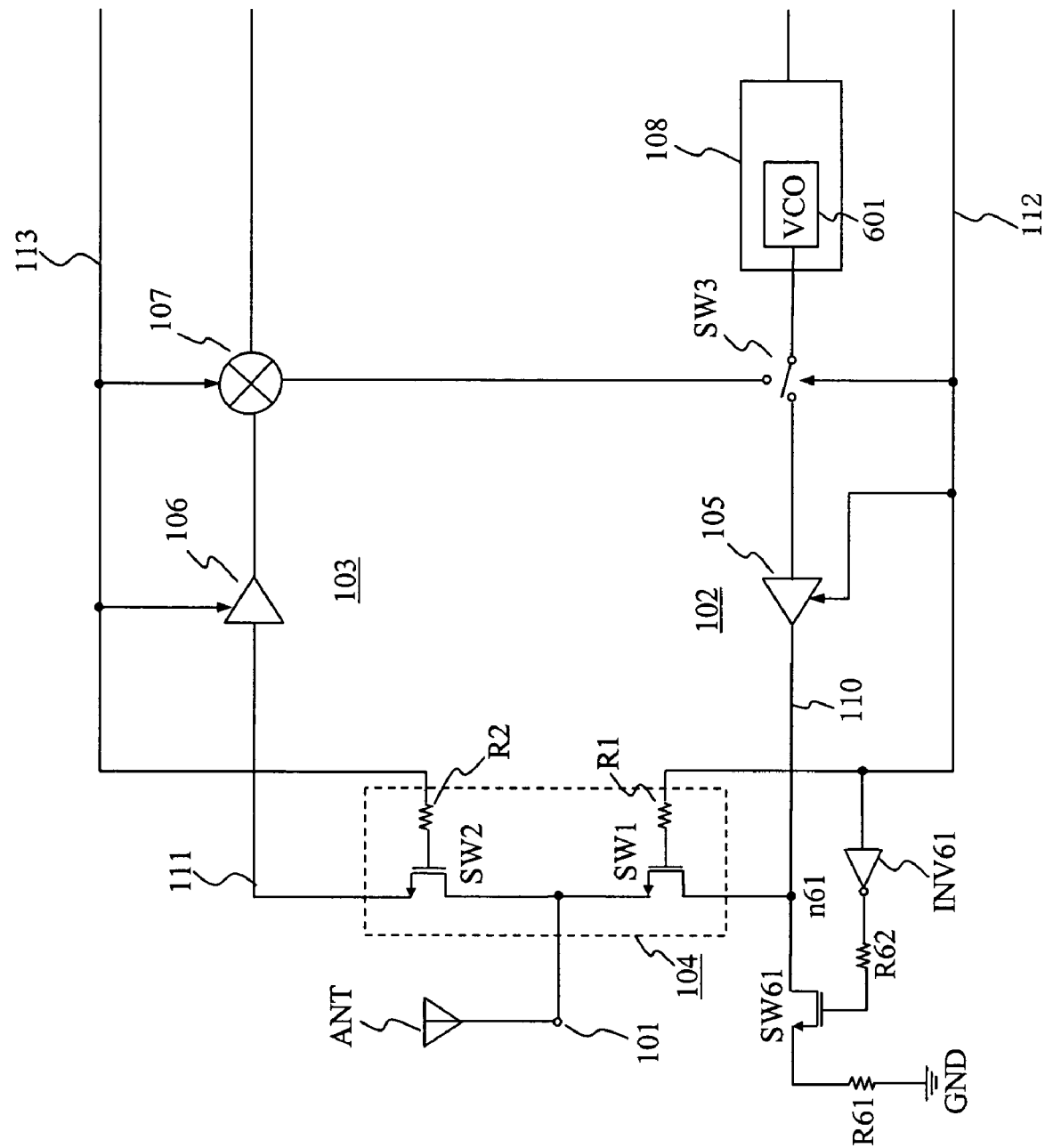
FIG. 5 is a schematic diagram showing a receiver/transmitter circuit of a third preferred embodiment.

FIG. 5 is a schematic diagram showing a receiver/transmitter circuit of a third preferred embodiment. In the receiver/transmitter circuit of the third embodiment, the receiver/transmitter circuit includes a resistor R61, a switch element SW61 operated in response to the transmit control signal 112 and a resistor R62.

The resistor R61 is connected between the output terminal of the power amplifier 105 and the ground voltage node. The ground voltage node is applied the ground voltage. A value of the resistor R61 is designed to same value as an input impedance of the antenna. When the receiver/transmitter circuit disclosed in the third embodiment is used as RF circuit of Bluethooth (registered trademark of Telefonaktiebolaget LM Ericsson, Sweden), the value of the resistor R61 is designed 50Ω.

The switch element SW61 is connected between the resistor R61 and the output terminal of the power amplifier 105. The switch element SW61 includes a NMOS transistor. The transistor included in the switch element SW61 has a gate electrode connected to the transmit control signal line 112 via the resistor R62 and an inverter INV61, a first electrode connected to the resistor R61 and a second electrode connected to the output terminal of the power amplifier 105 via a node n61. An inversion signal of the transmit control signal 112 is applied to the control gate of the transistor.

The input terminal of the power amplifier 105 is connected to the oscillator 601 via the switch circuit SW3 and the output terminal of the power amplifier 105 is connected to the switch element SW 61 and the switch element SW1 via the node n61.

An operation of the receiver/transfer circuit in the third preferred embodiment is described below.

First, before a transmit operation, the transmit control signal 112 is the "L" level. The switch element SW1 is switched OFF in response to the "L" level of the transmit control signal 112. The power amplifier 105 and the antenna terminal 101 are disconnected by the switch element SW1. The switch element SW61 is switched ON in response to the inverted signal of the transmit control signal 112. The output terminal of the power amplifier 105 and the resistor R61 are connected by the switch element SW61. That is, the load impedance from the output side of the power amplifier 105 is 50Ω of the resistor R61.

Second, at the start of the transmit operation, the transmit control signal 112 is changed from the "L" level to the "H" level. The switch element SW1 is turned on in response to the "H" level of the transmit control signal 112. Since the switch element SW1 is turned on, the power amplifier 105 and the antenna terminal 101 are connected by the switch element SW1. The switch element SW61 is turned off in response to the inverted signal of the transmit control signal 112. In the transmit operation, the load impedance from the output side of the power amplifier 105 is 50Ω of the input impedance of the antenna. That is, the load impedance of the output side of the power amplifier 105 before the transmit operation is same as that of after the transmit operation. The load fluctuation at the oscillator 601 caused by the load fluctuation at the power amplifier 105 is reduced. As a result, according to reduce the load fluctuation at the oscillator 601, the noise radiated from the antenna ANT is reduced.

Fourth Preferred Embodiment

Figure 6:
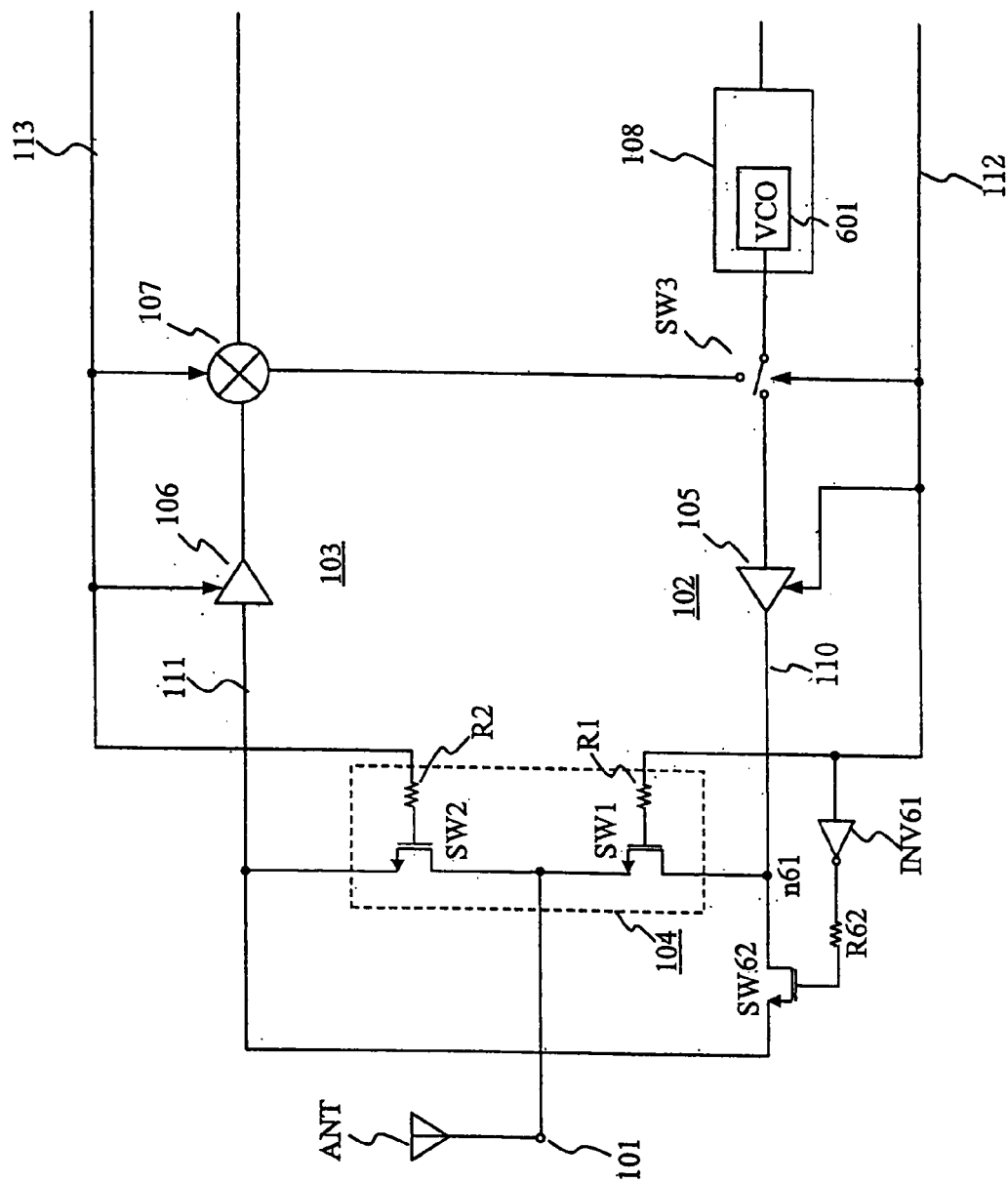
FIG. 6 is a schematic diagram showing a receiver/transmitter circuit of a fourth preferred embodiment.

FIG. 6 is a schematic diagram showing a receiver/transmitter circuit of a fourth preferred embodiment. In the receiver/transmitter circuit of the fourth embodiment, the receiver/transmitter circuit includes a switch circuit SW62 for connecting the output terminal of the power amplifier 105 to the receive circuit 103 in response to the transmit control signal 112. The switch circuit SW62 includes a NMOS transistor. The NMOS transistor included in the switch circuit SW62 has a first electrode connected to the output terminal of the power amplifier 105, a second electrode connected to the input terminal of the low noise amplifier 106 and a gate electrode connected to the transmit control signal line 112 via the resistor R61 and the inverter INV61. The inversion signal of the transmit control signal 112 is applied to the control gate of the transistor.

When the receiver/transmitter circuit disclosed in the fourth embodiment is used as RF circuit of Bluethooth, the value of the input impedance of the low noise amplifier 106 is designed 50Ω by a matching circuit.

An operation of the receiver/transfer circuit in the fourth preferred embodiment is described below.

First, before transmit operation, the transmit control signal 112 is the "L" level. The switch element SW1 has off state in response to the "L" level of the transmit control signal 112. The power amplifier 105 and the antenna terminal 101 are disconnected by the switch element SW1. The switch element SW62 is switched ON in response to the inverted signal of the transmit control signal 112. The output terminal of the power amplifier 105 is connected to the input terminal of the low noise amplifier 106 by the switch element SW62. That is, the load impedance from the output side of the power amplifier 105 is 50Ω of the input impedance of the low noise amplifier 106.

Second, at the start of the transmit operation, the transmit control signal 112 is changed from the "L" level to the "H" level. The switch element SW1 is turned on in response to the "H" level of the transmit control signal 112. Since the switch element SW1 is turned on, the power amplifier 105 and the antenna terminal 101 are connected by the switch element SW1. The switch element SW62 is turned off in response to the inverted signal of the transmit control signal 112. In the transmitting operation, the load impedance from the output side of the power amplifier 105 is 50Ω of the input impedance of the antenna.

That is, the load impedance of the output side of the power amplifier 105 before the transmit operation is same as that of after the transmit operation. The load fluctuation at the oscillator 601 caused by the load fluctuation at the power amplifier 105 is reduced. As a result, according to reduce the load fluctuation at the oscillator 601, the noise radiated from the antenna ANT is reduced.

Fifth Preferred Embodiment

Figure 7:
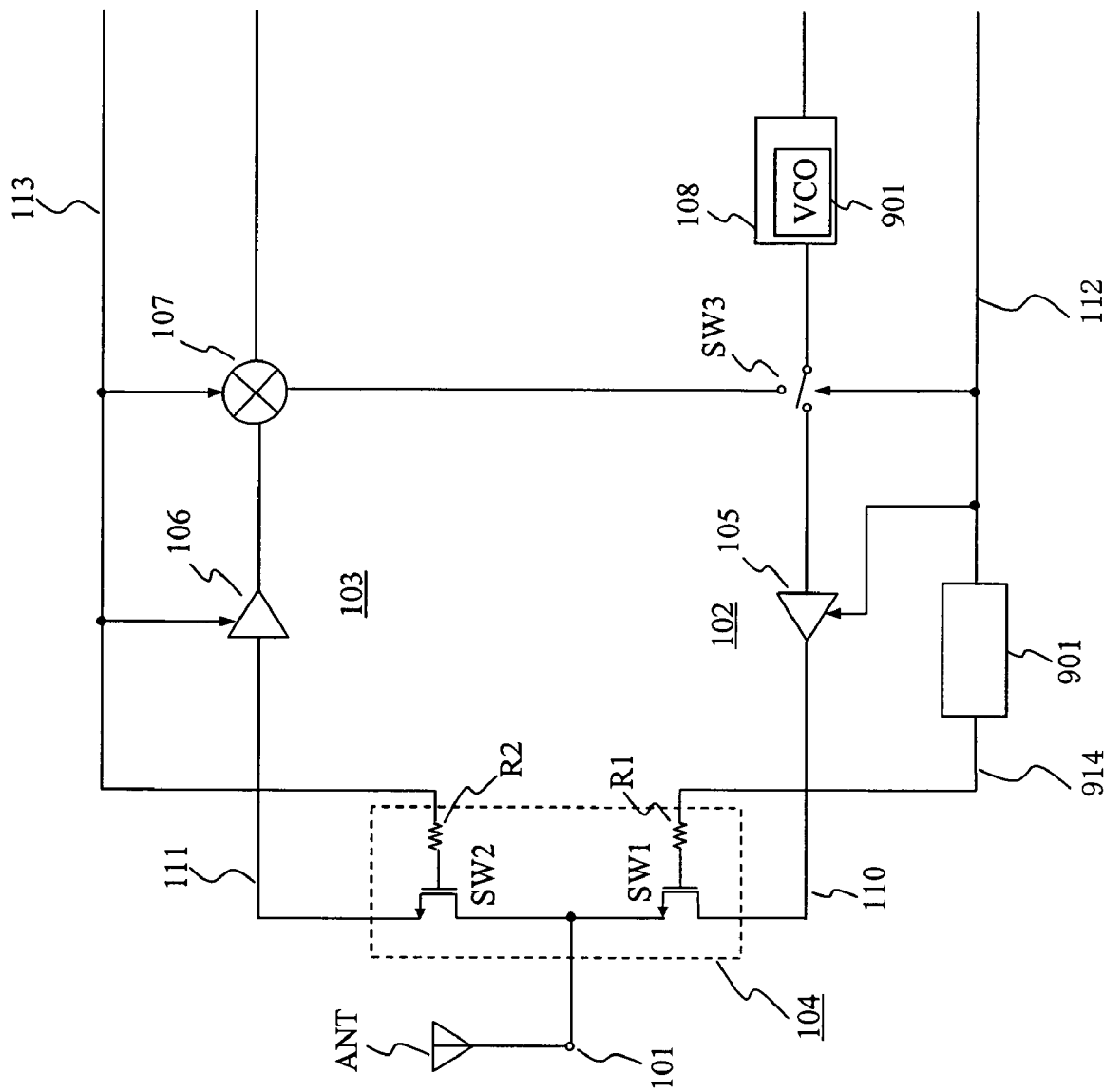
FIG. 7 is a schematic diagram showing a receiver/transmitter circuit of a fifth preferred embodiment.

FIG. 7 is a schematic diagram showing a receiver/transmitter circuit of a fifth preferred embodiment. In the receiver/transmitter circuit of the fifth embodiment, the receiver/transmitter circuit includes a delay circuit 901 for delaying the transmit control signal 112 and for outputting the delayed signal as a switching signal 914. The delay circuit 901 is connected between the transmit control signal line 112 and the switching signal line 914. The switching signal 914 outputted from the delay circuit 901 is passed through the switching line 914. The switching signal line 914 is connected to the switch element SW1 via the resistor R1. Other components are the same as disclosed in the first embodiment shown in FIG. 1.

Figure 8:
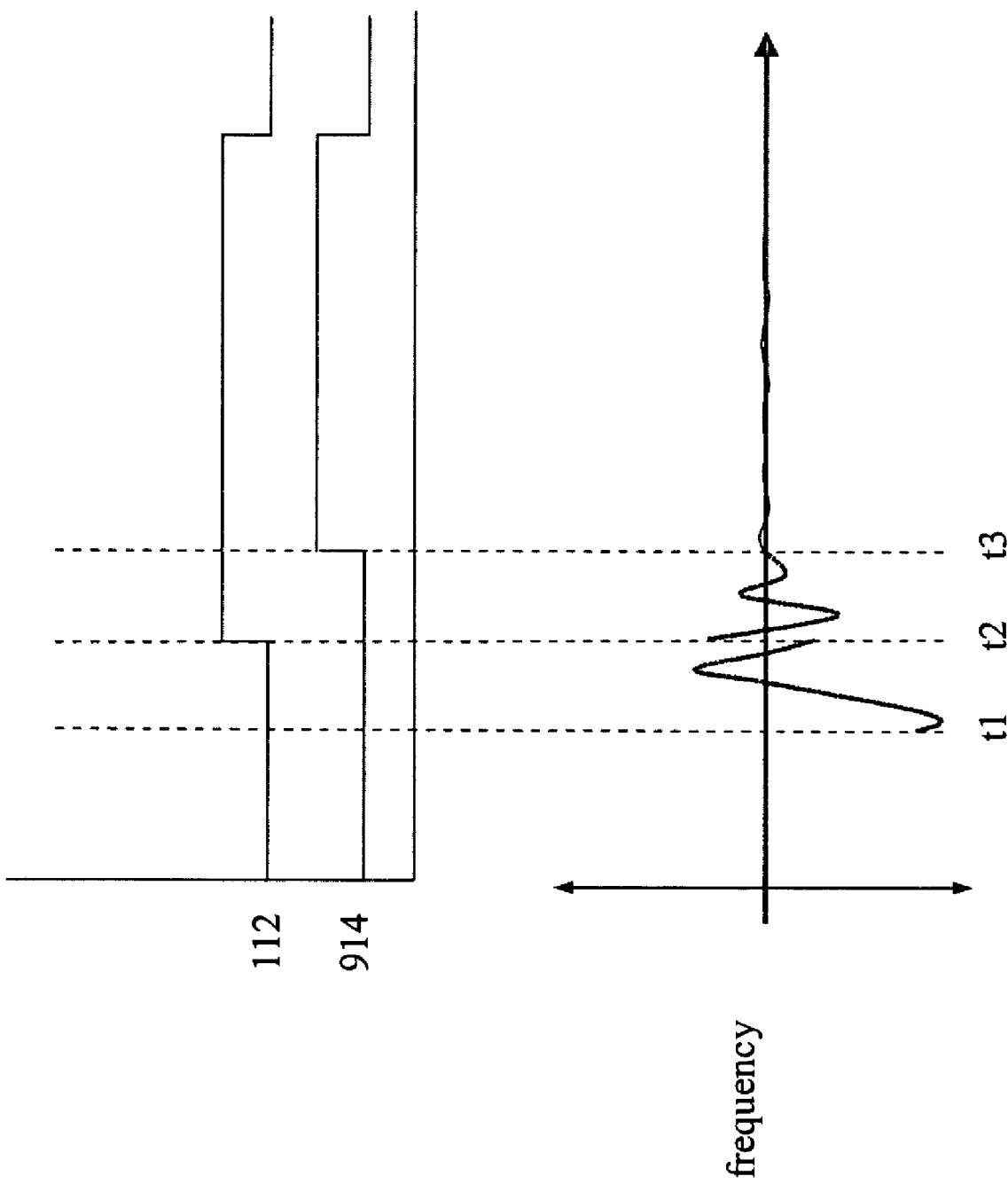
FIG. 8 is a plot showing the transmit control signal 112, a switching signal 914 and a frequency outputted from a PLL circuit 108.

An operation of the receiver/transmitter circuit in the fifth preferred embodiment is described below. FIG. 8 is a plot showing the transmit control signal 112, a switching signal 914 and a frequency outputted from a PLL circuit 108. At t1, the PLL circuit 108 is activated. The frequency at the PLL 108 is converged to a predetermined frequency. The transmit control signal 112 is changed from the "L" level to the "H" level at the t2. The PLL circuit 108 and the input terminal of the power amplifier 105 are connected by the switch circuit SW3 in response to the "H" level of the transmit control signal 112. The power amplifier 105 is activated in response to the "H" level of the transmit control signal 112. Accordingly, the activated power amplifier 105 is connected to the oscillator 901, the load impedance at the oscillator 901 is fluctuated. Since the load impedance at the oscillator 601 is fluctuated, the frequency generated in the oscillator 901 is fluctuated. Then, the frequency oscillated by the oscillator 901 is converged to a predetermined frequency.

The switching signal 914 is changed from the "L" level to the "H" level at t3. The switch element SW1 is turned on in response to the "H" level of the switch signal 914. Since the switch element SW1 is turned on, the transmission signal 110 outputted from the power amplifier 105 is transferred to the antenna terminal 101 via the switch element SW1. After the frequency at the output of the PLL circuit 108 is converged to the predetermined frequency, the transmission signal 110 is transferred to the antenna terminal 101. As a result, the noise radiated from the antenna ANT is reduced.

While the preferred form of the present invention has been described, it is to be understood that modifications will be apparent to those skilled in the art without departing from the spirit of the invention. The scope of the invention is to be determined solely by the following claims.

What is claimed is:

1. A receiver/transmitter circuit, comprising:
   an antenna terminal;
   a transmitter circuit which outputs a transmission signal in response to a transmit control signal;
   a receiver circuit which receives a reception signal from the antenna terminal;
   a waveform control circuit which outputs a switching signal having a gradual logic transition in response to the transmit control signal;
   a first switch connected between the antenna terminal and the transmitter circuit, wherein the first switch transfers the transmission signal to the antenna terminal in response to the switching signal; and
   a second switch connected between the antenna terminal and the receiver circuit,
   wherein the first switch includes a first transistor which has a first terminal connected to the antenna terminal, a second terminal connected to the transmitter circuit and a control terminal, and wherein said second switch includes a second transistor which has a first terminal connected to the antenna terminal, a second terminal connected to the receiver circuit and a control terminal, and
   wherein the waveform control circuit includes a resistor and a capacitor, wherein a first end of the resistor is connected to the control terminal of the first transistor, and a second end of the resistor is connected to receive the transmit control signal, and wherein the capacitor is connected between the first end of the resistor and a ground voltage node.

2. A receiver/transmitter circuit, comprising:
   an antenna terminal;
   a transmitter circuit which outputs a transmission signal in response to a transmit control signal;
   a receiver circuit which receives a reception signal from the antenna terminal;
   a waveform control circuit which outputs a switching signal having a gradual logic transition in response to the transmit control signal;
   a first switch connected between the antenna terminal and the transmitter circuit, wherein the first switch transfers the transmission signal to the antenna terminal in response to the switching signal; and
   a second switch connected between the antenna terminal and the receiver circuit,
   wherein the first switch includes a first transistor which has a first terminal connected to the antenna terminal, a second terminal connected to the transmitter circuit and a control terminal, and wherein said second switch includes a second transistor which has a first terminal connected to the antenna terminal, a second terminal connected to the receiver circuit and a control terminal, and
   wherein the waveform control circuit includes a first node, a current source circuit which outputs a set current to the first node in response to the transmit control signal, a ground voltage node and a capacitor connected between the first node and the ground voltage node.

3. The receiver/transmitter circuit according to claim 2, wherein the current source circuit includes:
   a power voltage node and a ground voltage node;
   a switch element operable in response to the transmit control signal;
   a first current mirror circuit which is connected between the power voltage node and the ground voltage node, wherein the first current mirror circuit has a current input side connected to the power voltage node and a current output side connected to the first node; and
   a second current mirror circuit operated in response to the transmit control signal, wherein the second current mirror circuit is connected to the power voltage node and wherein the second current mirror circuit has a current input side connected to the current output side of the first current mirror circuit and a current output side connected to the first node.

4. The receiver/transmitter circuit according to claim 2, further comprising a power amplifier which outputs the transmission signal in response to the transmit control signal.

5. A receiver/transmitter circuit, comprising:

an antenna terminal;

a transmitter circuit which outputs a transmission signal in response to a transmit control signal;

a receiver circuit which receives a reception signal from the antenna terminal;

a first switch connected between the antenna terminal and the transmitter circuit, wherein the first switch transfers the transmission signal to the antenna terminal in response to the transmit control signal;

a second switch connected between the antenna terminal and the receiver circuit;

a ground voltage node;

a resistor connected to the ground voltage node; and a third switch which connects the transmitter circuit to the resistor in response to the transmit control signal.

6. The receiver/transmitter circuit according to the claim 5, wherein the first switch is turned on in response to a first logic level of the transmit control signal and is turned off in response to a second logic level of the transmit control signal, and wherein the second switch is turned off in response to the first logic level of the transmit control signal and is turned on in response to the second logic level of the transmit control signal.

7. The receiver/transmitter circuit according to the claim 5, wherein the third switch includes a transistor which has a first electrode connected to the resistor, a second electrode connected to the transmitter circuit and a control electrode which receives an inverted signal of the transmit control signal.

8. The receiver/transmitter circuit according to the claim 5, wherein the transmitter circuit includes a power amplifier which outputs the transmission signal in response to transmit control signal.

9. A receiver/transmitter circuit, comprising:

an antenna terminal;

a transmitter circuit which outputs a transmission signal in response to a transmit control signal;

a receiver circuit which receives a reception signal from the antenna terminal;

a first switch connected between the antenna terminal and the transmitter circuit, wherein the first switch transfers the transmission signal to the antenna terminal in response to the transmit control signal;

a second switch connected between the antenna terminal and the receiver circuit;

a third switch which connects the output of the transmitter circuit to the input of the receiver circuit in response to the transmit control signal.

10. The receiver/transmitter circuit according to the claim 9, wherein the first switch is turned on in response to a first logic level of the transmit control signal and is turned off in response to a second logic level of the transmit control signal, and wherein the second switch is turned off in response to the first logic level of the transmit control signal and is turned on in response to the second logic level of the transmit control signal.

11. The receiver/transmitter circuit according to the claim 9, wherein the third switch includes a transistor which has a first electrode connected to the receiver circuit, a second electrode connected to the transmitter circuit and a control electrode which receives an inverted signal of the transmit control signal.

12. The receiver/transmitter circuit according to the claim 9, wherein the transmitter circuit includes a power amplifier which outputs the transmission signal in response to transmit control signal.

13. The receiver/transmitter circuit according to the claim 9, wherein the receiver circuit includes a low noise amplifier which is inputted with the receiving signal.

* * * * *